3,104,813
REGULATING AND SHUT-OFF UNIT FOR A PREFERABLY GAS-HEATED FLOW-TYPE WATER HEATER
Johannes Vagn Baatrup, Sonderborg, Als, Denmark, assignor to Danfoss ved ingenior Mads Clausen, Elsmark, Denmark, a Danish firm
Filed Oct. 25, 1960, Ser. No. 64,863
Claims priority, application Denmark Oct. 27, 1959
6 Claims. (Cl. 236—102)

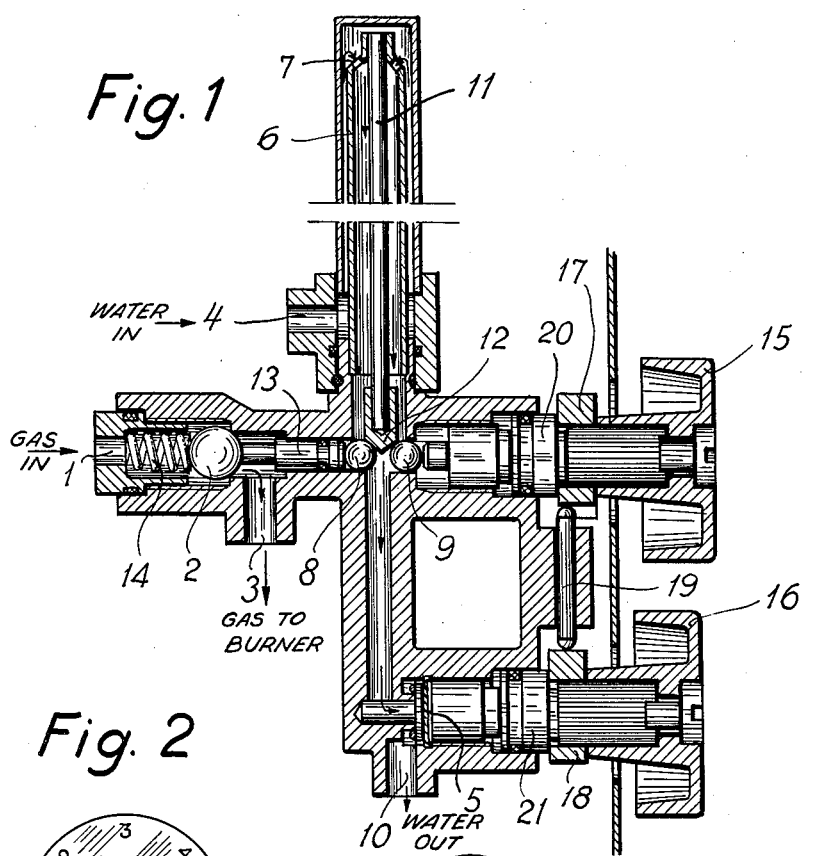
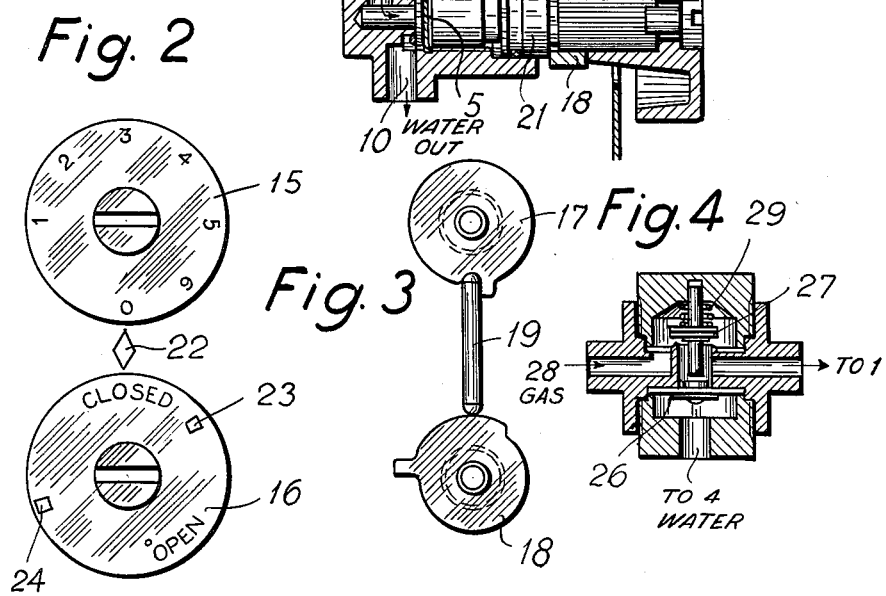

The invention relates to a regulating and shut-off unit for a preferably gas-heated flow-type water heater for regulating the fuel supply to the burner of the water heater in dependence on the flow of water through the said heater and with a thermal expansible tubular phial or feeler tube containing a bar attached to the feeler tube at one end and extending in the longitudinal direction of the feeler tube. When the free pointed end of the said bar is forced into position between two displaceable ball- or cylinder-shaped bodies, the bar guides a spring activated valve body in the fuel flow opening of the shut-off unit.

A flow-type water heater has to supply water of a constant temperature which is adjusted by means of an operating handle provided on the water heater, and the arrangement has to be so as to ensure that there is in no circumstances any risk of the water being heated so much that it is vapourised and may involve an explosion. In the known flow-type water heaters the desired temperature of the water tapped is obtained by adding more or less cold water to the hot water by means of a so-called temperature selector. A condition of keeping the temperature in these known flow-type water heaters constant is that the pressure and the temperature of the supply water are constant and that the gas pressure and the calorific value of the gas are likewise constant. As a result, flow-type water heaters are relatively complicated and costly to manufacture since they have to be provided with pressure regulators for water and gas alike. The gas supply to the burner of the water heater is opened automatically by means of a diaphragm when water flows through the water heater, the said diaphragm being controlled by the pressure drop across a Venturi tube. All these components are as mentioned rather complicated and furthermore sensitive to calcareous matter and impurities contained in the water. Furthermore, in these known water heaters in which cold water is added to the hot water there is no compensation for fluctuations in the temperature of the supply water. Finally, the amount of water discharged by the water heater is dependent on the adjusted temperature.

The object of the invention is to remedy these disadvantages and to provide a regulating and shut-off unit for a gas-heated flow-type water heater as a result of which the water heater can be of far less complicated design and therefore both cheaper and more reliable in operation than the known water heaters. It is a further object to provide a water heater discharging an amount of water independent of the adjusted temperature, and maintaining a constant temperature independently of the temperature of the supply water.

This is accomplished by a regulating and shut-off unit in accordance with the invention, the essential feature of which is that the tubular feeler body or temperature sensing element is placed in the flow path of the heated water and is in contact with the tube substantially throughout its length.

The result obtained is a simple construction for controlling the heat supply direct by means of the actual temperature of the water and without varying the flow area of the water, and a design in which unfavourable action by deposits of impurities and calcareous matter is practically excluded, such components as in the known water heaters of the flow-type are particularly sensitive to calcareous deposits, such as pressure regulators, diaphragm and Venturi tubes, being dispensed with.

A preferred embodiment of the regulating and shut-off unit according to the invention in which the displaceable bodies are inserted between a regulating spindle and the valve body has the essential feature that the regulating spindle and the displaceable bodies are of such dimensions that the valve body even in the position of the regulating spindle corresponding to fully open valve may be forced against its seat by the spring when the displaceable bodies are resting in contact with each other.

When the regulating spindle has been adjusted in its longitudinal direction in accordance with the desired temperature of the discharge water, the valve body of the gas valve will as a consequence of the wedge carried by the feeler tube being more or less displaced between the balls adjust itself in such a position that the burner is actually fed with the necessary amount of gas for heating the water to the desired temperature. If the temperature of the water for some reason or other rises above a certain value, the feeler tube will increase in length as a result of thermal expansion and the wedge will be withdrawn from between the balls and the displaceable balls will get very close to each other, that is, the effective length of the regulating spindle will be so short that the gas valve closes completely.

In accordance with the invention it is convenient that the tube constituting the feeler is placed in such manner that both its outer side and its inner side are in contact with the water flow. The result obtained is a quick heat transmission between feeler and water so that the regulating unit acts very promptly.

To ensure that it is only possible to open for gas to the burner simultaneously with there being open for the water flow, the following means are provided in accordance with the invention.

A cam disc attached to the regulating spindle of the gas valve is by means of a longitudinally displaceable pin so coupled to another cam disc which is permanently attached to a valve spindle of a shut-off valve for the water flow that the gas valve can only be opened when the shut-off valve for water is open. In this embodiment it is not necessary that the valve body of the gas valve is capable of closing completely in each position of the regulating spindle.

In view of the adjustment of the regulating spindle it is convenient according to the invention that each cam disc is attached to its spindle by means of a coupling having inside grooves to engage conforming grooves extending in axial direction on the spindle.

The invention will now be further described with reference to the drawing, in which FIGURE 1 is a section through a regulating and shut-off unit according to the invention, FIGURE 2 is a regulating handle on the spindles for regulating the gas valve and water valve, FIGURE 3 shows schematically the coupling system between the cam discs provided on the regulating spindle for the gas valve and the spindle for the water valve, and FIGURE 4 is a section through a water safety device of known kind.

The gas flows to the regulating unit through an opening 1 and—when a gas valve with a ball-shaped valve body 2 is open—the gas may flow on through the opening 3 to the burner (not shown) of the water heater. The water which is heated by the burner flows in through a pipe inlet 4 when a valve 5 at a discharge pipe outlet 10 for the water is opened. From the pipe inlet 4 the water flow rises on all sides of a tubular temperature responsive element or temperature sensing element 6, passing through holes 7 provided in the free upper end of the said sensing element and hence down through the sensor past a pair of balls 8 and 9 and the valve 5 to the discharge pipe outlet 10. The sensing element 6 is of a material having a comparatively high coefficient of thermal expansion, for example, brass, and at the free end of the sensing element is attached a bar 11 of Invar or another material with a low coefficient of thermal expansion.

The bar 11 carries at its lower free end a wedge 12, the oblique surfaces of which are resting against the balls 8 and 9 which are displaceable in the direction of movement of the valve body 2. Between the ball 8 and the valve body 2 is provided a likewise axially displaceable pin 13 which is capable of pressing against the valve body 2, overcoming the action of a spring 14 and unseating the ball 2. The ball 9 is prevented from moving to the right in the figure by a regulating spindle 20 threaded into the thermostatic regulating unit and adjustable longitudinally by turning a knob 15. When the temperature of the water in the sensing element exceeds the value set by means of the knob, the temperature-responsive element 6 will expand, whereas the length of the bar 11 remains substantially unaltered. The wedge 12 will therefore withdraw slightly from the balls 8 and 9, whereby the spring 14 may force the valve body 2 a further distance towards its seat so that the gas supply to the burner is reduced, that is, the temperature of the water is reduced.

To eliminate any risk of opening for the gas supply to the burner by the knob 15 being turned when the valve 5 is closed, thereby admitting a water flow through the water heater, the spindle 20 of the gas valve and the spindle 21 of the valve 5 are coupled together by means of cam discs 17 and 18, respectively, mounted on the spindle and a pin 19 which is mounted between the said discs and is displaceable in its longitudinal direction. Thus, the knob 15 of the regulating spindle for the gas valve cannot be turned until a knob 16 provided on the inner side of the spindle has been turned away from the position corresponding to closed valve. This can be best seen from FIGURES 2 and 3 which show the knobs 15 and 16 and the cam discs 17 and 18, respectively, with the intermediate pin 19. As will be seen, the pin 19 rests, as long as the handle 16 is in the position indicated, on top of a cam of the cam disc 18, being thereby forced into a notch provided in the cam disc 17 so that the handle 15 cannot be turned from closed position, in which the zero point marked on a scale on the handle is opposite a pointer 22. When the handle 16 is turned into a somewhat open position in which a mark 23 is opposite the pointer 22, the pin moves down from the cam of the cam disc 18, that is, the handle 15 may be turned so that the figure 1 on the scale is opposite the pointer 22, whereby the gas valve begins to open. When the figure 6 is opposite the pointer 22, the valve is fully open. Correspondingly, the valve 5 is fully open when a mark 24 on the knob 16 is opposite the mark 22. When the water flow is to be cut off again, it is necessary first to shut off the gas valve, since it is only in this case the pin 19 can be forced upwards into such position that the cam disc 18 permits turning of the handle 16 into closed position.

To avoid any risk of damaging the water heater in case of failing water supply, a water safety device of known type, FIGURE 4, may be connected to the water supply piping of the water heater by means of an opening in the line eventually leading to the inlet 4. The water pressure acts on a diaphragm 26 so that a gas valve 27 is kept open when there is water in the supply piping, whereby the gas flow may enter at the opening 28 and leave at an opposite opening to flow to the inlet 1. A spring 29 will close the gas valve 27 if the water pressure falls below a certain minimum. If the total of the forces exerted on the valve 27 by the gas pressure and the spring pressure exceeds the pressure exerted by the water on the diaphragm 26, the valve will cut off the gas supply to the water heater. The water safety device shown in FIGURE 4 is thus also acting as a safety cut-out means in case of excessive gas pressure, which, in particular, is of importance when the water heater is heated by means of bottled gas.

What I claim and desire to secure by Letters Patent is:

1. A regulating and shut-off unit for a flow-type water heater for regulating fluid fuel supply to the burner of the heater in dependence upon the temperature of water flowing from said water heater, said unit comprising a fuel flow control valve comprising, a fuel inlet connectable to a source of fluid fuel and a fuel outlet connectable to the burner, a valve body constantly biased to a position closing said fuel valve, temperature-responsive means for variably controlling the extent said valve body opens said control valve to variably control supply of fluid fuel to said burner in dependence upon the temperature of the water delivered by said heater, said unit having a water inlet for receiving the heated water from said heater and a water outlet, said temperature-responsive means comprising a temperature-responsive element disposed to sense the temperature of the heated water flowing through said regulating unit, said element comprising, a temperature-responsive elongated tube having one end fixed and an opposite end free so that said tube is capable of axial expansion and contraction in response to temperature variations of said heated water, a tubular casing open at one end and inverted over said element in fluid-tight relationship to said unit, said element being disposed in position for the heated water from said heater to bathe the exterior surfaces thereof along substantially its entire axial length free to expand and contract axially and having openings disposed to admit the heated water internally of said tube and means to cause the heated water to flow axially internally thereof substantially along substantially the length thereof in a given direction axially of said tube and out of the water outlet of said unit, a thermally-stable spindle internally of said sensing element having one end free and an opposite end attached to said free end and extending coaxially with said sensing element, wedge means on said spindle free end movable axially in response to axial movement of said spindle in dependence upon axial contraction and expansion of said sensing element, means displaceable by said wedge means and disposed to be separated by said wedge means to act upon said valve body to cause said valve body to open said fuel valve an amount proportional to the axial movement of said wedge means, in response to decreases of temperature of said heated water below a preset temperature level, whereby the fuel supply to said burner is controlled variably and proportionally to temperature variations of said heater water, and means cooperative with said wedge means to preset the temperature level at which said wedge means in its axial travel will cause opening of said fuel valve.

2. A regulating and shut-off unit for a flow-type water heater for regulating fluid fuel supply to the burner of the heater in dependence upon the temperature of water flowing from said water heater, said unit comprising a fuel flow control valve comprising, a fuel inlet connectable to a source of fluid fuel and a fuel outlet connectable to the burner, a valve body constantly biased to a position closing said fuel valve, temperature-responsive means for variably controlling the extent said valve body opens said control valve to variably control supply of fluid fuel to said burner in dependence upon the temperature of the water delivered by said heater, said unit having a water inlet for receiving the heated water from said heater and a water outlet, said temperature-responsive means comprising a temperature-responsive element disposed to sense the temperature of the heated water flowing through said regulating unit, said element comprising a temperature-responsive elongated tube having one end fixed and an opposite end free so that said tube is capable of axial expansion and contraction in response to temperature variations of said heated water, a tubular casing open at one end and inverted over said element in fluid-tight relationship to said unit, said element being disposed in position for the heated water from said heater to bathe the exterior surfaces thereof along substantially its entire length free to expand and contract axially and having openings disposed to admit the heated water internally of said tube and means to cause the heated water to flow axially internally thereof substantially along substantially the length thereof in a given direction axially of said tube and out of said water outlet of said unit, a thermally-stable spindle internally of said sensing element having one end free and an opposite end attached to said free end and extending coaxially with said sensing element, wedge means on said spindle free end movable axially in response to axial movement of said spindle in dependence upon axial contraction and expansion of said sensing element, fixed abutment means, and displaceable bodies, one of said displaceable bodies being in contact with said fixed abutment means and the other of said bodies being positioned to act on said valve body, and said displaceable bodies being disposed to be separated by said wedge means to act upon said valve body to cause said valve body to open said fuel valve an amount proportional to the axial movement of said wedge means in response to decreases of temperature of said heated water below a preset temperature level, whereby the fuel supply to said burner is controlled variably and proportionally to temperature variations of said heater water.

3. A regulating and shut-off unit according to claim 2, in which said displaceable bodies comprise a pair of guided balls disposed in operation on opposite sides of said wedge means to be separated by said wedge in dependence upon axial travel thereof when the heated water is below said preset temperature level, one of said balls being disposed for displacement in a direction for acting upon displacement by said wedge means to cause said valve body to open said fuel valve, and means temporarily immovable limiting the travel of the other ball.

4. A regulating and shut-off unit according to claim 3, in which said means temporarily immovable comprises a spindle positionable variably axially in different axial positions including an axial position corresponding to a position in which said valve body opens said fuel valve fully open, and said displaceable bodies and spindle having such dimensions that said valve body can close said fuel valve when said spindle is in said axial position corresponding to a full open condition of said fuel valve and said displaceable bodies are resting in contact with each other.

5. A regulating and shut-off unit for a flow-type water heater for regulating fluid fuel supply to the burner of the heater in dependence upon the temperature of water flowing from said water heater, said unit comprising a fuel flow control valve comprising, a fuel inlet connectable to a source of fluid fuel and a fuel outlet connectable to the burner, a valve body constantly biased to a position closing said fuel valve, temperature-responsive means for variably controlling the extent said valve body opens said control valve to variably control supply of fluid fuel to said burner in dependence upon the temperature of the water delivered by said heater, said unit having a water inlet for receiving the heated water from said heater and a water outlet, said temperature-responsive means comprising a temperature-responsive element disposed to sense the temperature of the heated water flowing through said regulating unit, said element comprising a temperature-responsive elongated tube having one end fixed and an opposite end free so that said tube is capable of axial expansion and contraction in response to temperature variations of said heated water, a tubular casing open at one end and inverted over said element in fluid-tight relationship to said unit, said element being disposed in position for the heated water from said heater to bathe the exterior surfaces thereof along substantially its entire axial length free to expand and contract axially and having openings disposed to admit the heated water internally of said tube and means to cause the heated water to flow axially internally thereof substantially along substantially the length thereof in a given direction axially of said tube and out of said water outlet of said unit, a thermally-stable spindle internally of said sensing element having one end free and an opposite end attached to said free end and extending coaxially with said sensing element, wedge means on said spindle free end movable axially in response to axial movement of said spindle in dependence upon axial contraction and expansion of said sensing element, displaceable bodies disposed to be separated by said wedge means disposed to act upon said valve body to cause said valve body to open said fuel valve an amount proportional to the axial movement of said wedge means in response to decreases of temperature of said heated water below a preset temperature level, whereby the fuel supply to said burner is controlled variably and proportionally to temperature variations of said heater water, and thermostatic and gas shut-off means cooperative with said wedge means to preset the temperature level at which said wedge means in its axial travel will cause opening of said fuel valve including means to keep said fuel valve closed.

6. A regulating and shut-off unit according to claim 5, including a shut-off valve for closing said water outlet, said means to keep said fuel valve closed comprising a regulating spindle, a cam disc attached to said regulating spindle, said water shut-off valve comprising a spindle having a cam disc fixed thereto, and a displaceable pin cooperative with camming surfaces on said cam discs configured to insure in conjunction with said pin that said thermostatic and gas shut-off means is effective to permit opening of said fuel valve when said water shut-off valve is closed.

References Cited in the file of this patent

UNITED STATES PATENTS

| Re. 19,456 | Clayton et al. | Feb. 12, 1935 |
| 1,476,377 | Siebenlist | Dec. 4, 1923 |
| 1,954,903 | Walker | Apr. 17, 1934 |
| 2,107,673 | Lovekin | Feb. 8, 1938 |
| 2,263,227 | Wilkinson | Nov. 18, 1941 |
| 2,786,713 | Donaldson | Mar. 26, 1957 |

FOREIGN PATENTS

| 75,927 | Netherlands | Sept. 15, 1954 |
| 733,767 | Germany | Apr. 2, 1943 |